United States Patent
Chan et al.

(10) Patent No.: US 12,402,053 B2
(45) Date of Patent: Aug. 26, 2025

(54) SEAMLESS BLUETOOTH SWITCHING SYSTEM

(71) Applicant: Razer (Asia-Pacific) Pte. Ltd., Singapore (SG)

(72) Inventors: Chee Oei Chan, Singapore (SG); Min-liang Tan, Singapore (SG)

(*) Notice: Subject to any disclaimer, the term of this patent is extended or adjusted under 35 U.S.C. 154(b) by 380 days.

(21) Appl. No.: 18/041,209

(22) PCT Filed: May 31, 2021

(86) PCT No.: PCT/SG2021/050301
§ 371 (c)(1),
(2) Date: Feb. 9, 2023

(87) PCT Pub. No.: WO2022/055415
PCT Pub. Date: Mar. 17, 2022

(65) Prior Publication Data
US 2023/0308976 A1    Sep. 28, 2023

Related U.S. Application Data

(60) Provisional application No. 63/078,273, filed on Sep. 14, 2020.

(51) Int. Cl.
*H04W 36/18* (2009.01)
*H04W 36/00* (2009.01)
(Continued)

(52) U.S. Cl.
CPC ......... *H04W 36/18* (2013.01); *H04W 36/035* (2023.05); *H04W 76/10* (2018.02); *H04W 76/30* (2018.02)

(58) Field of Classification Search
CPC ..... H04W 36/18; H04W 76/10; H04W 76/30; H04W 36/035
See application file for complete search history.

(56) References Cited

U.S. PATENT DOCUMENTS

2010/0180063 A1*  7/2010  Ananny ............... H04L 67/563
                                                      710/52
2012/0083209 A1   4/2012  Giles et al.
(Continued)

FOREIGN PATENT DOCUMENTS

CN      106851530 A      6/2017
EP        2925038 A1     9/2015

OTHER PUBLICATIONS

"Bluetooth Core Specification", Rev. 5.2. Bluetooth SIG, Dec. 31, 2019.
(Continued)

*Primary Examiner* — Tuan H Nguyen

(57) ABSTRACT

Disclosed are methods and devices for facilitating the seamless handover of Bluetooth communications of a Bluetooth accessory device from a first Bluetooth host to a second Bluetooth host. A first host identifier uniquely identifies the first Bluetooth host for its Bluetooth communications, and a second host identifier uniquely identifies the second Bluetooth host for its Bluetooth communications. The host identifiers are stored in the Bluetooth accessory device, and they are provided to an application on the mobile device that allows a user to select either the first or the second host as the selected host for the Bluetooth accessory device, without having to re-pair the host device to the accessory device. Because re-pairing is not necessary, the user can quickly and seamlessly switch the Bluetooth accessory's communications among multiple different host devices.

20 Claims, 4 Drawing Sheets

(51) Int. Cl.
*H04W 76/10* (2018.01)
*H04W 76/30* (2018.01)

(56) References Cited

U.S. PATENT DOCUMENTS

2013/0282932 A1  10/2013  Robert et al.
2017/0351471 A1  12/2017  Passeri et al.
2020/0019255 A1   1/2020  Gilbert et al.

OTHER PUBLICATIONS

International Patent Application No. PCT/SG2021/050301; International Search Report and Written Opinion mailed Aug. 31, 2021; 5 pages.
European search report; dated Jun. 12, 2023; application # 21867235.0.
Chinese First Office Action and Search Report; dated Jun. 11, 2025; Application # 202180055188.8.

* cited by examiner

SEAMLESS BLUETOOTH SWITCHING SYSTEM

TECHNICAL FIELD

The disclosure herein relates generally to components, systems, and methods for seamlessly switching communications between various Bluetooth-enabled devices.

BACKGROUND

Bluetooth-enabled devices, including for example headphones, wireless speakers, and other accessories, have grown in popularity over the years. At the same time, numerous devices, such as cars, televisions, radios, computers, mobile phones, and/or smartphones are also Bluetooth-enabled and are capable of connecting to Bluetooth devices, including accessory devices. In order for a Bluetooth-enabled device to communicate with another Bluetooth-enabled device, the two devices typically must first follow a Bluetooth pairing process, in which the devices exchange identification information and other parameters in a handshaking procedure. In order to connect the Bluetooth-enabled device to a different Bluetooth-enabled device, the Bluetooth-enabled accessory may need to disconnect from the first device and then connect with the second device. This process can be lengthy, time consuming, and frustrating for users that wish to quickly switch Bluetooth communications between multiple devices.

BRIEF DESCRIPTION OF THE DRAWINGS

Throughout the drawings, like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which.

DESCRIPTION

The following detailed description refers to the accompanying drawings that show, by way of illustration, specific details and aspects in which the disclosure may be practiced. One or more aspects are described in sufficient detail to enable those skilled in the art to practice the disclosure. Other aspects may be utilized and structural, logical, and electrical changes may be made without departing from the scope of the disclosure. The various aspects described herein are not necessarily mutually exclusive, as some aspects can be combined with one or more other aspects to form new aspects. Various aspects are described in connection with methods and various aspects are described in connection with devices and vice versa. However, it may be understood that aspects described in connection with methods may similarly apply to the devices, and vice versa. Throughout the drawings, it should be noted that like reference numbers are used to depict the same or similar elements, features, and structures.

As discussed in more detail below, the present disclosure provides for a system that allows a Bluetooth-enabled device (e.g., an accessory device) to seamlessly switch its Bluetooth communications between various Bluetooth-enabled devices (e.g., host devices) without having to re-pair to the newly-selected device. This solution improves speed and continuity when switching, for example, a Bluetooth accessory device's connection from one host device to another host device.

Figure 1:
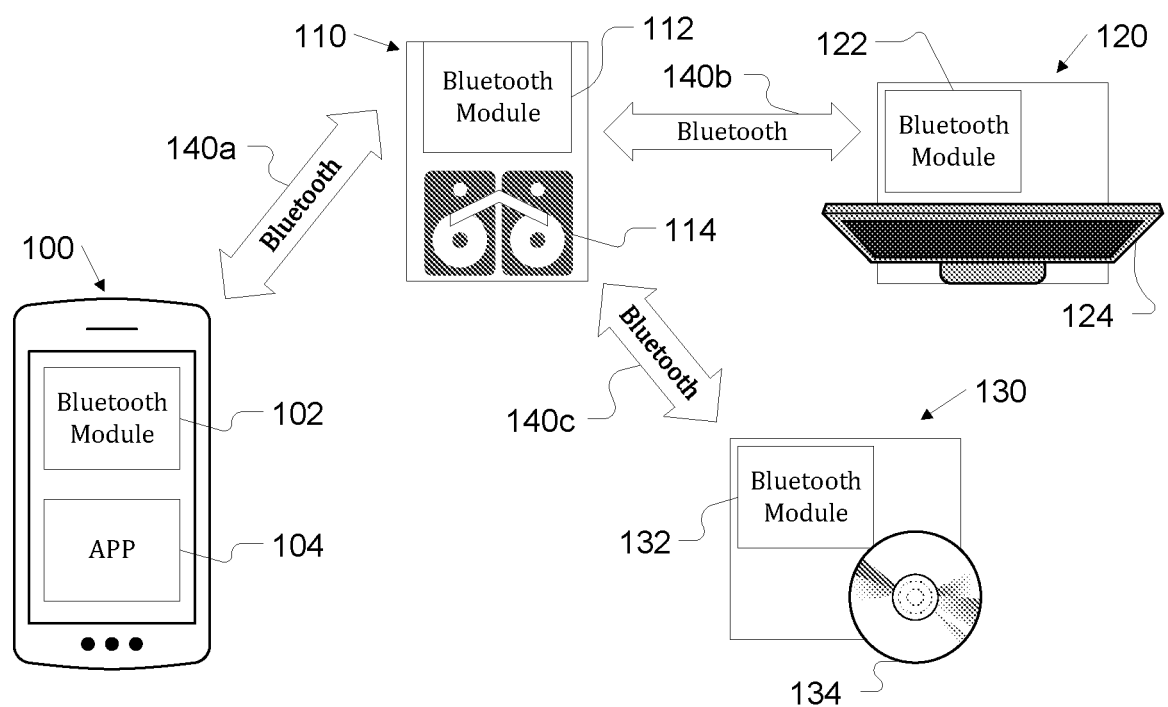
FIG. 1 shows an exemplary collection of Bluetooth-enabled devices that are capable of Bluetooth communications.

FIG. 1 illustrates a collection of Bluetooth enabled devices that may be able to communicate with one another using the Bluetooth communications protocol. Bluetooth is a widely-used, short-range wireless protocol standard that allows for the wireless exchange of data over short distances. Bluetooth operates in the 2.402 GHz to 2.48 GHz frequency band, and covers various classes of devices with varying output powers. The Bluetooth Special Interest Group (the "Bluetooth SIG") maintains the Bluetooth standards which have evolved over time as new versions have been released, starting with Bluetooth 1.0, and currently to Bluetooth 5.2. The term "Bluetooth," unless specific to a particular release (or an amended version of the release), is meant to encompass all past and future releases/versions of the Bluetooth standard. When a specific release is referenced, e.g., "Bluetooth 4.1," it is meant to encompass all revisions of the specific release as well as compatible releases of the standard. As one example, the current version of the core Bluetooth specification is Bluetooth Core Specification, Rev. 5.2 (Dec. 31, 2019), published by the Bluetooth SIG. The term "Bluetooth communication," unless specific to a particular message or process in the Bluetooth standard, refers to the exchange of user data (i.e., data in the application layer) on a Bluetooth communication interface between two Bluetooth devices that have built a Bluetooth protocol stack up to the application layer.

Prerequisite to Bluetooth communication of user data in the application layer, Bluetooth devices must follow a handshaking process called "pairing." The pairing process involves the exchange and verification of information between two Bluetooth-enabled devices. During pairing of two devices, the two devices establish a relationship by creating a shared secret key known as a "link key." After both devices store the same link key, they are "paired," and they may use the link key for the exchange of user data over the now-established Bluetooth communication interface. This pairing and communication mode may also be known as "Bluetooth classic" mode.

This type of pairing process often involves some level of user interaction so that the user can confirm that the correct device has been selected for pairing and that the two devices should commence with Bluetooth communications. For small accessory devices (such as Bluetooth-enabled headphones) without a display, the pairing process can be particularly cumbersome because without a display, the user may not know which host device the accessory is pairing with or which host device the accessory is connecting to. This can be problematic when there are many host devices with which the accessory may connect. As a result, the user must usually follow the pairing process each time the accessory device changes its Bluetooth connection from one host to another.

FIG. 1 shows a number of devices, each of which has a Bluetooth module that enables Bluetooth communication with other Bluetooth-enabled devices. For example, smartphone 100 is an exemplary Bluetooth-enabled device with Bluetooth module 102 that enables the smartphone 100 to communicate with other Bluetooth-enabled devices. Smartphone 100 also has hardware and software (such as a processor and an operating system) that allows the smartphone 100 to instantiate user applications, such as APP 104. Headphones 110 is another exemplary Bluetooth-enabled device with Bluetooth module 112 that enables the headphones 110 to communicate with other Bluetooth-enabled devices. Headphones 110 may, for example, include speakers 114 for outputting audio. Television 120 is also an exemplary Bluetooth-enabled device with Bluetooth module 122 that enables the television 120 to communicate with other Bluetooth-enabled devices. CD player 130 is also an exemplary Bluetooth-enabled device with Bluetooth module 132 that enables the CD player 130 to communicate with other Bluetooth-enabled devices.

In operation, for example, headphones 110 may pair with television 120 to enable data communications between the two devices using Bluetooth communication protocols. Once the devices are paired, a Bluetooth communication interface 140b is established, and the television 120 may provide a stream of audio data to the headphones 110 using Bluetooth communication over Bluetooth communication interface 140b, which the headphones 110 interprets and then outputs as audio to its speakers 114. Alternatively, as another example, headphones 110 may pair with CD player 130 to enable data communications between the two devices using Bluetooth communication protocols. Once the devices are paired, a Bluetooth communication interface 140c is established, and the CD player 130 may provide a stream of audio data to the headphones 110 using Bluetooth communication over Bluetooth interface 140c, which the headphones 110 interprets and then outputs audio to its speakers 114. In these exemplary scenarios, the television 120 and CD player 130 may be referred to as host devices and the headphones 110 may be referred to as an accessory device. Typically, an accessory device, such as headphones 110, may be connected with one host device at a time. This means, for example, that headphones 110 may need to disconnect with television 120 in order to connect with and communicate with CD player 130. As explained earlier, the devices must first be paired in order for the devices to use the correct link key established for Bluetooth communications between the two connected devices.

In some cases, a Bluetooth-enabled device may communicate with another Bluetooth-enabled device using what is called Bluetooth low energy mode (also known as "Bluetooth LE" or "BLE"). In this mode, two devices may have limited communication capabilities as compared to pairing in Bluetooth classic mode described above. While a Bluetooth-enabled device may generally only be paired in Bluetooth classic mode with one other device, it may be paired with a second device if one of the pairings is in BLE mode. Referring to FIG. 1, for example, headphones 110 may be paired in BLE mode with smartphone 100 while headphones 110 also remains paired in Bluetooth classic mode with television 120. This allows smartphone 100 to exchange a limited amount of information with headphones 110 using Bluetooth low energy mode communications over the established Bluetooth low energy communication interface 140a, while the headphones 110 may also communicate with television 120 using Bluetooth classic mode communications over Bluetooth interface 140b to receive a stream of audio data from television 120, interpret the audio data, and output sounds on its speakers 114 based on the interpreted audio data. Alternatively, to output sounds based on audio data received from CD player 130, the headphones 110 may disconnect from the television 120 and connect with CD player 130 in Bluetooth classic mode to establish Bluetooth communication interface 140c, without impacting the Bluetooth low energy communications interface 140a that was already established between smartphone 100 and headphones 110. In this way, the APP 104, for example, may communicate limited information from smartphone 100 to headphones 110 over Bluetooth low energy communications interface 140a.

Bluetooth devices, such as headphones 110, may contain a memory for storing information about paired devices and/or previously paired devices. The information may include, for example, an identifier that uniquely identifies the device such as a media access control address ("MAC address") of a paired device, the link key established with the paired device, the name of the paired device, other information about the paired device, or other information about the communications interface established between the two devices. This type of information may be stored as a collection of information/identifiers in memory using commonly-understood database techniques, by storing, for example, each known device and its associated information/identifiers in fields and records of a database. By storing this information, the headphones 110 may, in a sense, remain "paired" with more than one Bluetooth device because by retaining pairing information for Bluetooth devices with which the headphones 110 have previously paired, the headphones 110 may easily switch Bluetooth communications from one Bluetooth device to another Bluetooth device without having to negotiate new pairing information in a re-repairing process.

Figure 2:
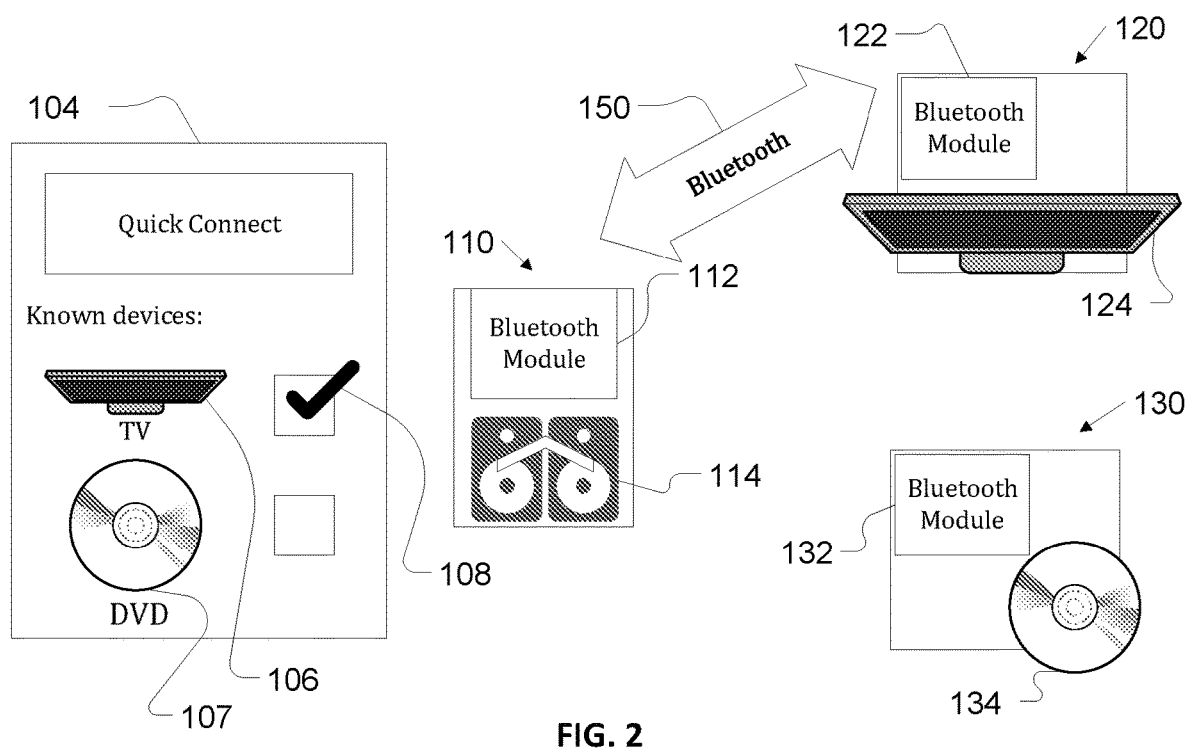
FIG. 2 shows an exemplary application (APP) that allows a Bluetooth-enabled device to seamlessly switch between selected Bluetooth-enabled devices.

Turning to FIG. 2, it shows how APP 104 may operate to exchange information with headphones 110. Implicit in FIG. 2 is that smartphone 100 (not shown) has established a Bluetooth communication interface (not shown) for Bluetooth communications with headphones 110. As discussed above with respect to FIG. 1, the interface may be established using Bluetooth low energy mode or Bluetooth classic mode. Once the smartphone 100 has established a Bluetooth communications interface, APP 104 may communicate with headphones 110. APP 104 may, for example, receive information about devices with which headphones 110 have previously paired. The information received from headphones 110 may include the MAC addresses of paired devices, link keys established with each paired device, the name of each paired device, or any other information stored in the memory of the headphones 110.

APP 104 may use the information received from headphones 110 to display certain information to a user of the APP 104 of smartphone 110. For example, APP 104 may display a list of known devices that was generated from the information received from headphones 110. In the example shown in FIG. 2, the APP 104 received information from headphones 110 as to two known Bluetooth devices with which headphones 110 had previously been paired. Based on the information received from the headphones 110, APP 104 may display pictures or names (e.g., TV icon 106 and CD icon 107), each corresponding to the headphones 110's known Bluetooth devices (e.g., television 120 and CD player 130). APP 104 may also provides a means for selecting at least one of the displayed known devices as the selected device. As shown in FIG. 2, for example, selection boxes next to each of displayed TV icon 106 and CD icon 107 may show which device has been selected by placing a selection indicator 108 in the selection box of the selected device. As indicated in the example of FIG. 2, selection indicator 108 indicates that TV icon 106 is the selected device. As is commonly understood, the selection indicator 108 may be user-selected in various manners, such as with a touch-screen, mouse, keyboard, etc., so that a user of the smartphone 100 may place the selection indicator 108 on the selected device, based on the desire of the user.

APP 104 may report the selected device to headphones 110 using, for example, the Bluetooth communication interface established between the two devices. The APP 104 may transmit the selected device to headphones 110, for example, at regular time intervals, when the selection indicator 108 is moved to a newly-selected device, when requested by the headphones 110, when a refresh is requested by the user, or in any other manner.

Figure 3:
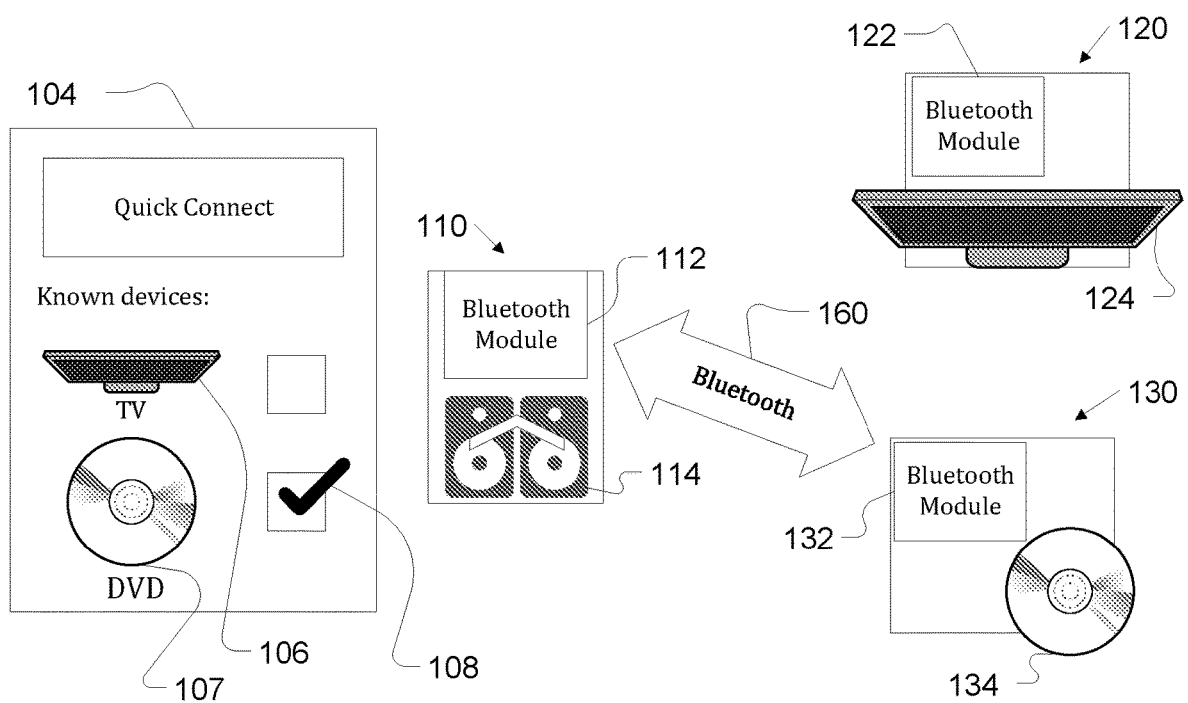
FIG. 3 shows an exemplary application (APP) that allows a Bluetooth-enabled device to seamlessly switch between Bluetooth-enabled devices.

Headphones 110 may receive information from the APP 104, indicating which device is the selected device. Based on the received information, headphones 110 may, for example, switch its Bluetooth communications to the selected device. Using FIG. 2 and FIG. 3 as examples, FIG. 2 shows that the selection indicator 108 has been placed next to TV icon 106, which corresponds to television 120 as the selected device. As such, headphones 110 sets its Bluetooth communications to be with television 120. In FIG. 3, for example, the selection indicator 108 has been placed next to CD icon 107, which corresponds to CD player 130 as the selected device. As such, headphones 110 sets its Bluetooth communications to be with CD player 130.

Importantly, the headphones 110 need not re-pair with the newly-selected device in order to communicate with it using Bluetooth communications. Although the headphones 110 would normally need to re-pair with the selected device before switching its Bluetooth communications from one device (e.g., television 120) to a different device (e.g., CD player 130), no re-pairing is required. Having previously paired with each Bluetooth-enabled device and stored information about each pairing in its memory, headphones 110 are able to seamlessly switch from communicating with the television 120 as the selected device for Bluetooth communications to communicating with CD player 130 as the newly-selected device for Bluetooth communications, without being disrupted by the pairing process. If Bluetooth communications with the newly-selected device are unsuccessful (perhaps, for example, the newly-selected device is no longer within Bluetooth communication range of the headphones 110), then the headphones 110 may inform the APP 104 that the Bluetooth communication with the newly-selected device was unsuccessful. The headphones 110 may wait a certain amount of time (e.g., a number of seconds) and/or retry a certain number of times before informing the APP 104 of the unsuccessful connection. In the case of unsuccessful Bluetooth communications with the newly-selected device, the headphones 110 may revert Bluetooth communications to be with the previously selected device.

The benefits of this seamless method means the user can quickly and easily switch among using different Bluetooth devices without the cumbersome interruption of the pairing process. For example, a user of smartphone 100 may select CD player 130 as the selected device in order to listen to a music audio stream that is generated by the CD player 130, transmitted to the headphones 110 using Bluetooth communications, and output on speakers 114 of headphones 110. While enjoying the music, the user may see something of interest on the television 120, and would like to listen to the audio stream from the television 120 on speakers 114 of headphones 110. To make the switch easily and quickly without having to re-pair the television 120 to the headphones 110, the user may select TV icon 106 in the APP 104, as shown in FIG. 2 with selection indicator 108, to indicate that television 120 is the selected device. Once selected, the headphones 110 are instructed to switch Bluetooth communications from the CD player 130 to the television 120 so that the audio stream from the television 120 is received by the headphones 110 using Bluetooth communications, and output on speakers 114 of headphones 110. Because the user is able to switch Bluetooth communications without having to re-pair the television 120, the user may quickly and simply receive the audio stream from the television 120 on headphones 110.

Figure 4:
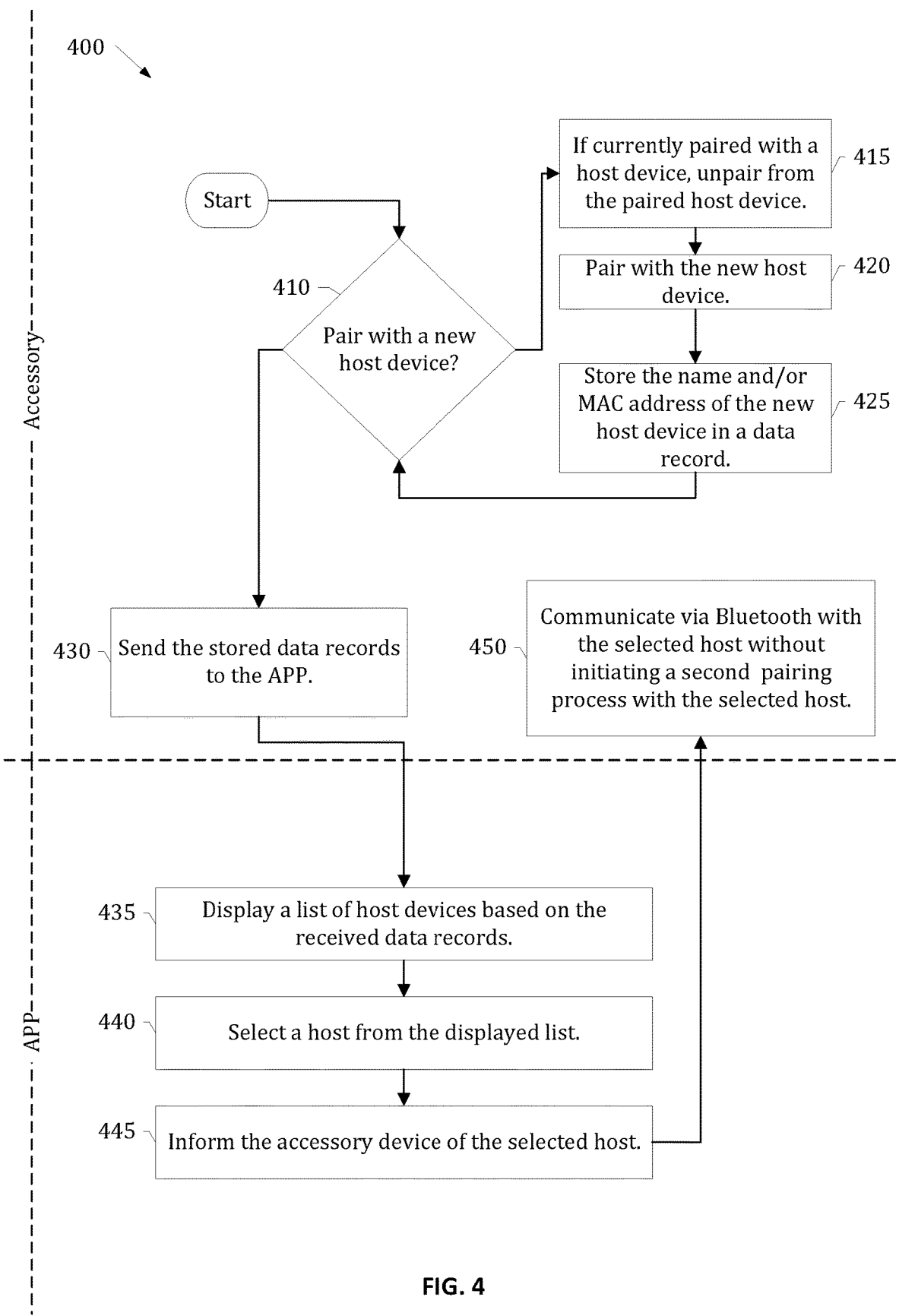
FIG. 4 shows a flow chart of an exemplary system that allows a Bluetooth-enabled device to seamlessly switch between Bluetooth-enabled devices.

FIG. 4 shows a flowchart 400 for an exemplary system described herein, where the top portion of the chart includes steps typically performed by, for example, a Bluetooth enabled device (e.g., an accessory) (e.g., headphones or wireless speakers) and the lower portion of the chart includes steps typically performed by, for example, an application (e.g., an APP) running on a Bluetooth-enabled computing device (e.g., a smartphone device) that can communicate with the accessory. To start, the accessory may decide to pair with a new host at step 410. If the accessory decides to pair with a new host, the accessory moves to step 415, where it disconnects, if currently paired with a host, from the currently-paired host. Next, in step 420, the accessory pairs with the new host device by following the Bluetooth pairing process (e.g., using a Bluetooth classic mode communication interface). Then in step 425, the accessory collects the unique identifier (e.g., MAC address), name, link key, and/or other information about the new host devices and may store it in memory (e.g., in a data record). The accessory may then decide to pair with another new host device in step 410, or, it may move to step 430 where it may send the stored data records (or any portion thereof) to the APP. Once received by the APP, in step 435, the APP may display a list of host devices based on the information in the data records it received from the accessory. In step 440, a host may be selected from the displayed list (e.g., by a user selection with a touch-screen, keyboard, etc.) which is then transmitted to the accessory in step 445 to inform the accessory device of the selected host. In step 450, the accessory switches its Bluetooth communications to be with the selected host without initiating a second pairing process with the selected host.

The following examples pertain to various exemplary embodiments.

Example 1 is a method for seamless handover of communications. The method includes receiving at an accessory a first host identifier that uniquely identifies a first host for communications. The method also includes receiving at the accessory a second host identifier that uniquely identifies a second host for communications. The method also includes storing in the accessory the first host identifier and the second host identifier as identifier information. The method also includes receiving at a mobile device at least a portion of the identifier information. The method also includes displaying at the mobile device a list of hosts based on the at least a portion of the identifier information. The method also includes selecting from among the list of hosts the first host as a selected host. The method also includes instructing the accessory to communicate with the selected host without re-pairing with the selected host. The method also includes selecting from among the list of hosts the second host as a newly-selected host. The method also includes instructing the accessory to switch communications from the selected host to the newly-selected host without re-pairing with the newly-selected host.

In example 2, the subject matter of example 1 may optionally include that the communications are Bluetooth communications.

In example 3, the subject matter of any one of examples 1 to 2 may optionally include that instructing the accessory to communicate with the selected host without re-pairing with the selected host includes instructing the accessory to communicate using Bluetooth communications without re-pairing with the selected host.

In example 4, the subject matter of any one of examples 1 to 3 may optionally include that receiving at the accessory the first host identifier includes pairing the first host with the accessory.

In example 5, the subject matter of any one of examples 1 to 4 may optionally include that the first host identifier includes a MAC address of the first host.

In example 6, the subject matter of any one of examples 1 to 5 may optionally include that the first host identifier includes a name of the first host.

In example 7, the subject matter of any one of examples 1 to 6 may optionally include that the identifier information includes a collection of host identifiers, wherein each host identifier in the collection of host identifiers corresponds to a different host.

In example 8, the subject matter of any one of examples 1 to 7 may optionally include that instructing the accessory to communicate with the selected host includes transmitting identifier information corresponding to the selected host to the accessory.

In example 9, the subject matter of any one of examples 1 to 8 may optionally include instructing the accessory to disconnect from the selected host when the accessory switches communications from the selected host to the newly-selected host.

In example 10, the subject matter of any one of examples 1 to 9 may optionally include that the mobile device receives the at least a portion of the identifier information using Bluetooth low energy communication mode with the accessory.

In example 11, the subject matter of any one of examples 1 to 10 may optionally include that instructing the accessory to communicate via communication with the selected host includes instructing the accessory to communicate using Bluetooth classic mode communication with the host.

In example 12, the subject matter of any one of examples 1 to 11 may optionally include that receiving at the mobile device the at least a portion of the identifier information includes receiving the at least a portion of the identifier information from the accessory using Bluetooth low energy mode communication.

In example 13 is a mobile device that includes a communication module configured to pair with and receive identifier information from an accessory. The identifier information comprises a first host identifier and a second host identifier. The first host identifier uniquely identifies a first host and the second host identifier uniquely identifies a second host. The mobile device also includes a user interface configured to allow selection of a selected host from a list of hosts derived from the identifier information. The communication module is also configured to send an instruction to the accessory indicating that the accessory is to communicate with the selected host without re-pairing with the selected host.

In example 14, the subject matter of example 13 may optionally include that the communication module is further configured to use Bluetooth low energy mode communication to send the instruction to the accessory.

In example 15, the subject matter of any one of examples 13 to 14 may optionally include that the first host and the second host were previously paired with the accessory.

In example 16, the subject matter of any one of examples 13 to 15 may optionally include that the first host identifier includes a MAC address of the first host.

In example 17, the subject matter of any one of examples 13 to 16 may optionally include that the first host identifier includes a name of the first host.

In example 18, the subject matter of any one of examples 13 to 17 may optionally include that the instruction includes identifier information corresponding to the selected host.

In example 19, the subject matter of any one of examples 13 to 18 may optionally include that the first host includes a Bluetooth-enabled television and the accessory comprises Bluetooth-enabled headphones.

Example 20 is an accessory that includes a communication module configured to receive during a first pairing process a first host identifier. The communication module is further configured to receive during a second pairing process a second host identifier. The first host identifier uniquely identifies the first host for communications and the second host identifier uniquely identifies the second host for communications. The accessory also includes an identification database that is configured to store the first host identifier and second host identifier as identifier information. The communication module is also configured to send at least a portion of the identifier information from the identification database to a mobile device. The communication module is also configured to receive from the mobile device a first message indicating the first host is a selected host. The first message also indicates that the accessory is to communicate with the selected host without repeating the first pairing process. The communication module is also configured to receive from the mobile device a second message indicating the second host is a newly-selected host. The second messages also indicates that the accessory is to communicate with the newly-selected host without repeating the second pairing process.

It can be understood that the described system can be implemented by means of hardware (e.g. a hard-wired circuit) and/or software (e.g. code segments or an entire application). For example, an application (also referred to as a "program") may be or be provided which has corresponding code segments (e.g. program code). The code segments may be executed on a processor and/or by means of a circuit which has the processor or multiple processors, and any, all, or portions thereof may execute one or more portions of the code segments.

The word "exemplary" is used herein to mean "serving as an example, instance, or illustration." Any example or design described herein as "exemplary" is not necessarily to be construed as preferred or advantageous over other examples or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one.

The term "processor" as, for example, used herein may be understood as any kind of entity that allows handling of data, signals, etc. These may be handled according to one or more specific functions executed by the processor.

A processor may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), as examples, or any combination thereof. Any other kind of implementation of the respective functions, which will be described below in further detail, may also be understood as a processor or logic circuit. It is understood that any two (or more) of the processors or logic circuits detailed herein may be realized as a single entity with equivalent functionality, and conversely that any single processor or logic circuit detailed herein may be realized as two (or more) separate entities with equivalent functionality. It is understood that one or more of the systems detailed herein may be performed (e.g., realized) by a processor, may by one or more specific functions executed by the processor.

The term "system" detailed herein may be understood as a set of interacting elements, the elements may be, by way of example and not of limitation, one or more physical components (e.g., processors, transmitters and/or receivers) and/or one or more digital components (e.g., code segments, instructions, protocols). Generally, the system may include one or more functions to be operated (also referred to as "operating functions") of which each may be controlled for operating the whole system.

A processor may be configured, e.g., by the code segments (e.g., software), to control the operation of a system (e.g., its operating sequence or the like) and may optionally include a memory to, for example, store code segments that represent the functions or processing that the controller performs. Additionally or alternatively, the memory may store one or more models, criterion, rules, and algorithms, as examples, as detailed herein. It is understood that any two (or more) of the controllers detailed herein may be realized as a single controller with substantially equivalent functionality, and conversely that any single controller detailed herein may be realized as two (or more) separate controller with substantially equivalent functionality. Additionally, references to a "controller" may refer to two or more controllers that collectively form a single controller.

The term "software" refers to any type of executable instruction, including firmware.

Various aspects of this disclosure may utilize or be related to wireless communication technologies. While some examples may refer to specific wireless communication technologies, the examples provided herein may be similarly applied to various other wireless communication technologies, both existing and not yet formulated, particularly in cases where such wireless communication technologies share similar features as disclosed regarding the following examples.

While the above descriptions and connected figures may depict electronic device components as separate elements, skilled persons will appreciate the various possibilities to combine or integrate discrete elements into a single element. Such may include combining two or more circuits from a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc. Also, it is appreciated that particular implementations of hardware and/or software components are merely illustrative, and other combinations of hardware and/or software that perform the methods described herein are within the scope of the disclosure.

It is appreciated that implementations of methods detailed herein are exemplary in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for seamless handover of communications, the method comprising:
    receiving at an accessory a first host identifier that uniquely identifies a first host for communications;
    receiving at the accessory a second host identifier that uniquely identifies a second host for communications;
    storing in the accessory the first host identifier and the second host identifier as identifier information;
    receiving at a mobile device at least a portion of the identifier information;
    displaying at the mobile device a list of hosts based on the at least a portion of the identifier information;
    selecting from among the list of hosts the first host as a selected host;
    instructing the accessory to communicate with the selected host without re-pairing with the selected host;
    selecting from among the list of hosts the second host as a newly-selected host;
    instructing the accessory to switch communications from the selected host to the newly-selected host without re-pairing with the newly-selected host; and
    when the communication between the accessory and the newly-selected host is successful, receiving by an accessory data stream from the newly-selected host, and when the communication between the accessory and the newly-selected host is unsuccessful, reverting to the communication with the selected host by the accessory.

2. The method of claim 1, wherein the communications comprise Bluetooth communications.

3. The method of claim 1, wherein instructing the accessory to communicate with the selected host without re-pairing with the selected host comprises instructing the accessory to communicate using Bluetooth communications without re-pairing with the selected host.

4. The method of claim 1, wherein receiving at the accessory the first host identifier comprises pairing the first host with the accessory.

5. The method of claim 1, wherein the first host identifier comprises a MAC address of the first host.

6. The method of claim 1, wherein the first host identifier comprises a name of the first host.

7. The method of claim 1, wherein the identifier information comprises a collection of host identifiers, wherein each host identifier in the collection of host identifiers corresponds to a different host.

8. The method of claim 1, wherein instructing the accessory to communicate with the selected host comprises transmitting identifier information corresponding to the selected host to the accessory.

9. The method of claim 1, further comprises instructing the accessory to disconnect from the selected host when the accessory switches communications from the selected host to the newly-selected host.

10. The method of claim 1, wherein the mobile device receives the at least a portion of the identifier information using Bluetooth low energy communication mode with the accessory.

11. The method of claim 1, wherein instructing the accessory to communicate via communication with the selected host comprises instructing the accessory to communicate using Bluetooth classic mode communication with the host.

12. The method of claim 1, wherein receiving at the mobile device the at least a portion of the identifier information comprises receiving the at least a portion of the identifier information from the accessory using Bluetooth low energy mode communication.

13. The method of claim 1, wherein:
receiving at the mobile device (100) the at least a portion of the identifier information comprises receiving at the mobile device (100) the at least a portion of the identifier information over a communication interface between the mobile device (100) and the accessory (110);
instructing the accessory to communicate without the selected host without re-pairing with the selected host comprises instructing over the communication interface the accessory to communication without the selected host without re-pairing with the selected host while maintaining the communication interface; and
instructing the accessory (110) to switch communications from the selected host to the newly-selected host without re-pairing with the newly-selected host comprises instructing over the communication interface the accessory (110) to switch communications from the selected host to the newly-selected host without re-pairing with the newly-selected host while maintaining the communication interface.

14. A mobile device comprising:
a communication module configured to pair with and receive identifier information from an accessory, wherein the identifier information comprises a first host identifier and a second host identifier, wherein the first host identifier uniquely identifies a first host, and wherein the second host identifier uniquely identifies a second host; and
a user interface configured to allow selection of the first host as a selected host from a list of hosts derived from the identifier information, wherein the communication module is further configured to send an instruction to the accessory, wherein the instruction indicates to the accessory to communicate with the selected host without re-pairing with the selected host and the user interface further configured to allow further selection of the second host as a newly-selected host from the list of hosts derived from the identifier information, wherein the communication module is further configured to send a further instruction to the accessory (110), wherein the further instruction indicates to the accessory (110) to switch communications from the selected host to the newly-selected host without re-pairing with the newly-selected host,
wherein when the communication between the accessory (110) and the newly-selected host is unsuccessful, the communication module is informed by the un-successfullness.

15. The mobile device of claim 14, wherein the communication module is further configured to use Bluetooth low energy mode communication to send the instruction to the accessory.

16. The mobile device of claim 14, wherein the first host and the second host were previously paired with the accessory.

17. The mobile device of claim 14, wherein the first host identifier comprises a MAC address or a name of the first host.

18. The mobile device of claim 14, wherein the instruction comprises identifier information corresponding to the selected host.

19. The mobile device of claim 14, wherein the first host comprises a Bluetooth-enabled television and the accessory comprises Bluetooth-enabled headphones.

20. An accessory comprising:
a communication module configured to receive during a first pairing process a first host identifier, wherein the first host identifier uniquely identifies the first host for communications, wherein the communication module is further configured to receive during a second pairing process a second host identifier, wherein the second host identifier uniquely identifies the second host for communications; and
an identification database configured to store the first host identifier and second host identifier as identifier information, wherein the communication module is further configured to send at least a portion of the identifier information from the identification database to a mobile device,
wherein the communication module is further configured to receive from the mobile device a first message indicating the first host is a selected host and indicating to communicate with the selected host without repeating the first pairing process,
wherein the communication module is further configured to receive from the mobile device a second message indicating the second host is a newly-selected host and indicating to communicate with the newly-selected host without having to repeat the second pairing process,
wherein when communication between the accessory (110) and the newly-selected host is successful, the accessory (110) receives data stream from the newly-selected host, and when communication between the accessory (110) and the newly-selected host is unsuccessful, the accessory (110) reverts to communication with the selected host.

* * * * *